United States Patent
Aramizu et al.

(12) 
(10) Patent No.: US 6,625,659 B1
(45) Date of Patent: Sep. 23, 2003

(54) ROUTER SWITCHES TO OLD ROUTING TABLE WHEN COMMUNICATION FAILURE CAUSED BY CURRENT ROUTING TABLE AND INVESTIGATES THE CAUSE OF THE FAILURE

(75) Inventors: Tatsuo Aramizu, Tokyo (JP); Tatsuhiko Amagai, Tokyo (JP); Hiroshi Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/484,459

(22) Filed: Jan. 18, 2000

(30) Foreign Application Priority Data

Jan. 18, 1999 (JP) .......................................... 11/009713

(51) Int. Cl.[7] .......................................... G06F 15/173
(52) U.S. Cl. ........................ 709/239; 709/242; 709/221
(58) Field of Search ................................ 709/238, 239, 709/240, 242, 243, 244, 223, 224, 221; 370/217, 399, 401, 225, 331, 316; 714/9

(56) References Cited

U.S. PATENT DOCUMENTS

| | | | | |
|---|---|---|---|---|
| 5,331,635 A | * | 7/1994 | Ota | 370/401 |
| 5,633,868 A | * | 5/1997 | Baldwin et al. | 370/331 |
| 5,903,545 A | * | 5/1999 | Sabourin et al. | 370/225 |
| 6,032,266 A | * | 2/2000 | Ichinohe et al. | 714/9 |
| 6,069,895 A | * | 5/2000 | Ayandeh | 370/399 |
| 6,084,864 A | * | 7/2000 | Liron | 370/316 |
| 6,324,161 B1 | * | 11/2001 | Kirch | 370/217 |

FOREIGN PATENT DOCUMENTS

JP          10-51447          2/1998

* cited by examiner

*Primary Examiner*—Le Hien Luu
(74) *Attorney, Agent, or Firm*—Sughrue Mion, PLLC

(57) ABSTRACT

Even when a communication failure happens to occur, the interrupted communication can be quickly recovered by a router apparatus. The router apparatus is comprised of: a plurality of routing tables into which new route information is stored every time route information is changed; a rewriting time saving unit for saving rewriting time information of the plurality of routing tables; a table switching unit for switching the plurality of routing tables; and a route processor unit for managing, for example, setting/rewriting/deleting the routing table based upon route information supplied by a network operator, or route information obtained by routing protocol. In this router apparatus, when a communication failure caused by the routing table occurs, the failed routing table is switched to another routing table into which old route information has been stored so as to continue the communication, and also, a communication trouble reason is investigated by comparing the route information before/after the failed routing table is switched.

3 Claims, 2 Drawing Sheets

ROUTER SWITCHES TO OLD ROUTING TABLE WHEN COMMUNICATION FAILURE CAUSED BY CURRENT ROUTING TABLE AND INVESTIGATES THE CAUSE OF THE FAILURE

BACKGROUND OF THE INVENTION

1. Field of the Invention

The present invention generally relates to a router apparatus used in a network. More specifically, the present invention is directed to such a router apparatus equipped with a routing table managing processor capable of rapidly recovering a network communication when a failure happens to occur in the network.

2. Description of the Related Art

In networks, large amounts of routing information are continuously communicated, and storage contents of routing tables are rewritten within huge numbers of routers from time to time.

Actually, communications are sometimes, suddenly interrupted because table contents are mistakenly rewritten by network operators, and furthermore, communication failures will occur due to illegal actions by network operators.

There is another problem that communication failures occur which are caused by not only own router, but also routers of third parties, while networks become more complex and highly advanced.

Once such a communication failure, or problem happens to occur, a first action should be taken to rapidly recover the interrupted communication prior to fact finding action.

However, since the conventional router apparatus has only one routing table, failure preventive characteristic of this router apparatus is deteriorated. As a result, such a conventional router apparatus has problems in that lengthy time is necessarily required when the failure occurs and thereafter the interrupted communication can be recovered, and furthermore, the reason why such a failure happens to occur cannot be easily investigated.

To avoid these problems, in a certain network, a plurality of router apparatuses are often arranged. However, even if those treatments are taken, when such a communication failure is caused by the routing table itself, such a communication failure still occurs.

SUMMARY OF THE INVENTION

The present invention has been made to solve the above-explained problems, and therefore, has an object of the invention to provide a router apparatus capable of rapidly recovering an interrupted communication when a communication failure happens to occur.

To achieve the above-explained object, a router apparatus, according to an aspect of the present invention, is characterized by comprising: a plurality of routing tables into which new route information is stored every time route information is changed; a rewriting time saving unit for saving rewriting time information of the plurality of routing tables; a table switching unit for switching the plurality of routing tables; and a route processor nit for managing, for example, setting/rewriting/deleting the routing table based upon route information supplied by a network operator, or route information obtained from routing protocol, wherein when a communication failure caused by the routing table occurs, the failed routing table is switched to another routing table into which old route information has been stored so as to continue the communication, and also, a communication failure reason is investigated by comparing the route information before/after the failed routing table is switched.

Also, the present invention provides such a router apparatus, characterized in that the old route information is the latest route information.

Also, the present invention is characterized in that only difference information is stored into the plurality of routing tables.

The normal router apparatus is equipped with only one routing table for storing thereinto route information, whereas the router apparatus of the present invention is characterized in that both old route information and new route information are simultaneously saved.

In the case that a communication failure happens to occur which may be predicted by such a reason that a content of a routing table is updated, the router apparatus immediately returns the new route information to the old route information so as to recover the present communication. Accordingly, the failure occurrence time can be reduced.

Also, since the old condition is saved, it can be easily compared with the failure condition, which may readily contribute to the investigation of the failure reason.

BRIEF DESCRIPTION OF THE DRAWINGS

A better understanding of the present invention may be made of reading a detailed description in conjunction with the accompanying drawings, in which.

DETAILED DESCRIPTION OF THE PREFERRED EMBODIMENTS

Referring now to drawings, various preferred embodiments of the present invention will be described in detail.

Arrangement of First Router Apparatus

Figure 1:
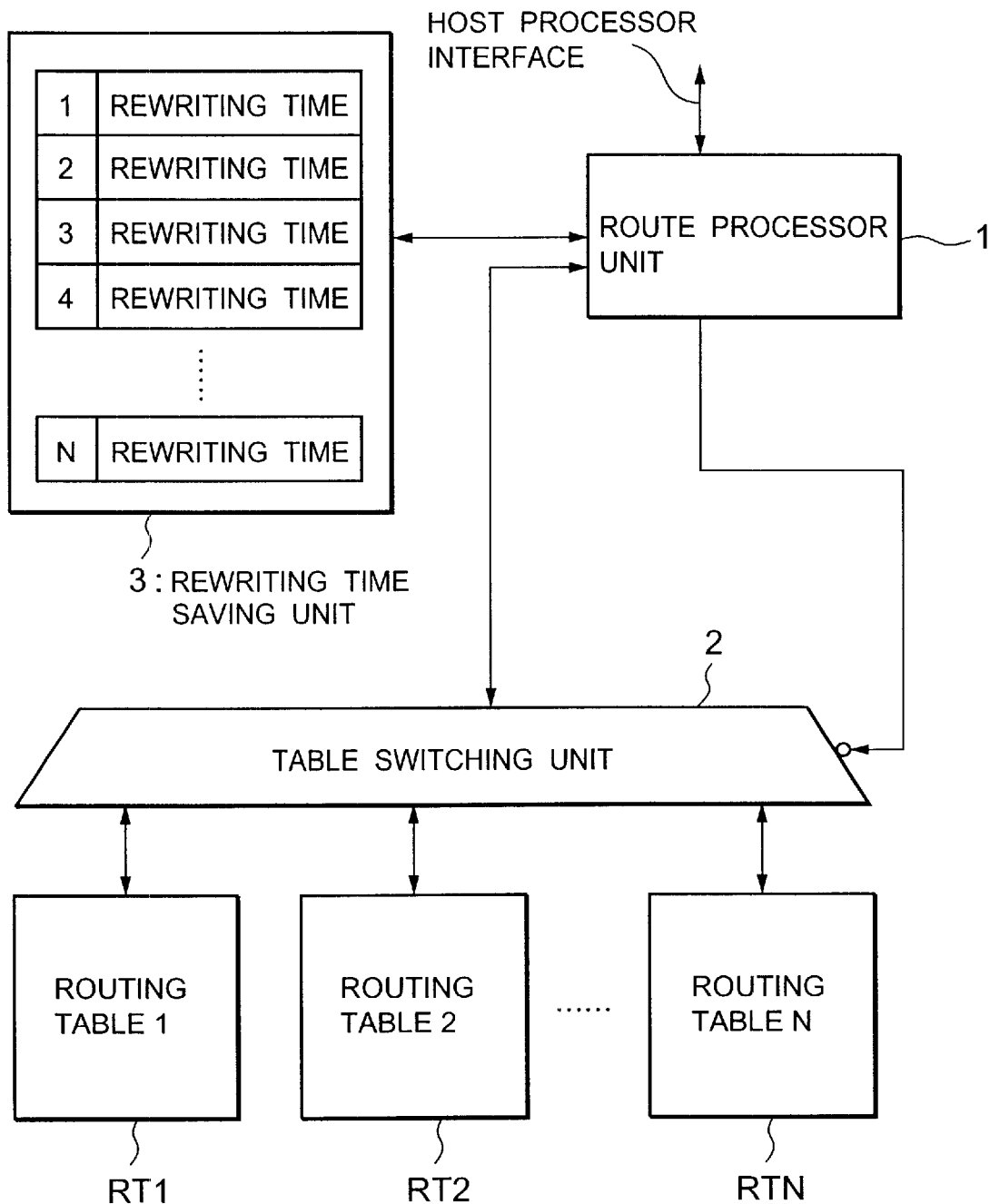
FIG. 1 is a block diagram for schematically showing an arrangement of a router apparatus according to a first embodiment of the present invention.
Figure 2:
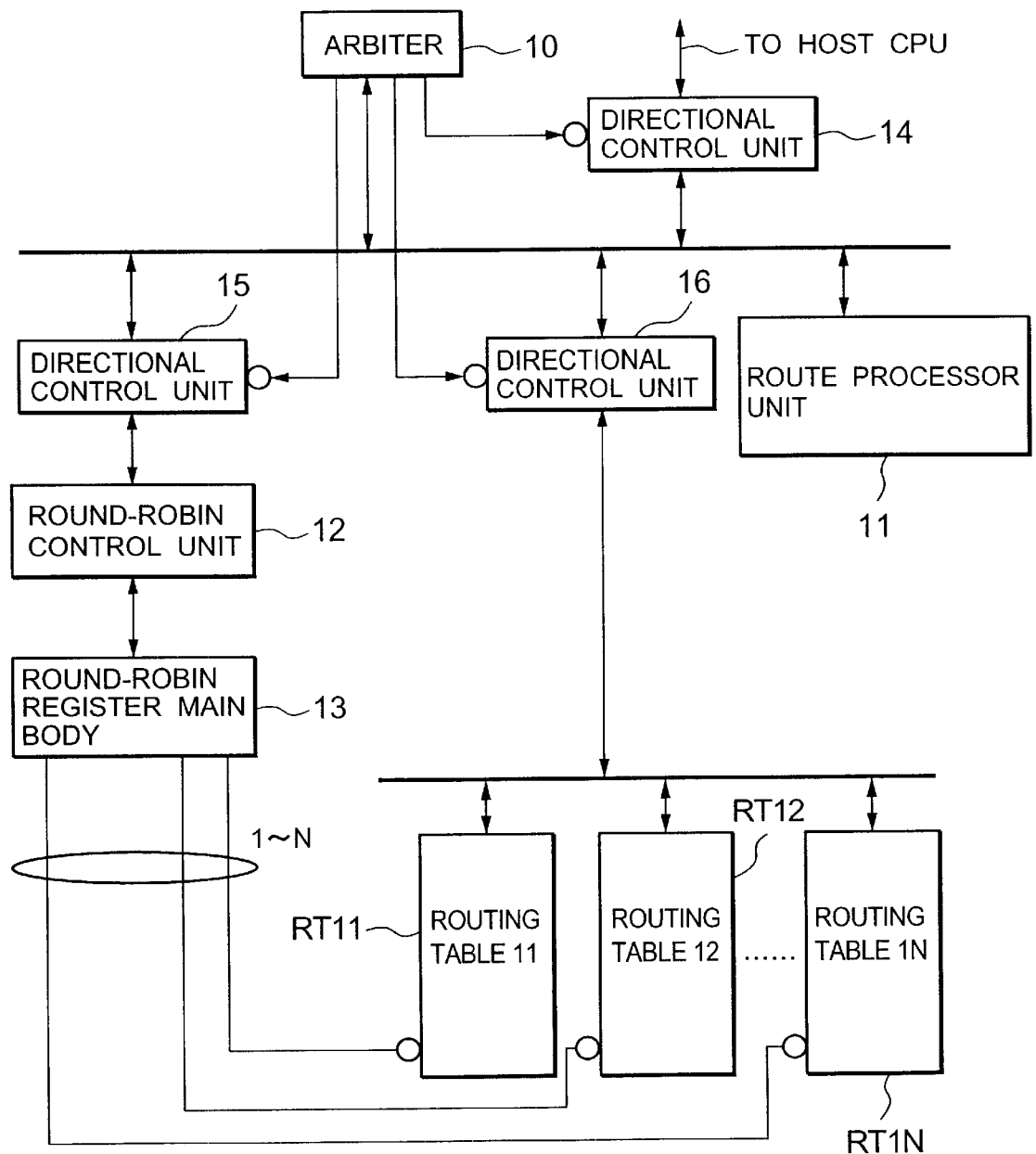
FIG. 2 is a block diagram for schematically showing an arrangement of a router apparatus according to a second embodiment of the present invention.

FIG. 1 is a block diagram for schematically showing an arrangement of a router apparatus according to a first embodiment of the present invention.

This router apparatus of the first embodiment is arranged as follows:

A table (routing table) switching unit 2 and a rewriting time saving unit 3 corresponding to routing tables are provided under control of a route processor unit 1.

Then, a plurality of routing tables RT1 to RTN are provided under control of the table switching unit 2.

Based upon route information supplied by a network operator and/or upon route information obtained from routing protocol, the route processor unit 1 may acquire such route information required for the own router apparatus. Furthermore, this route processor unit 1 manages a routing table, and also a communication with an external unit (not shown) based on all of the above-explained route information. In other words, this route processor unit 1 may set, rewrite, and delete the contents of the routing tables based upon the above-explained route information.

In this first router apparatus, a plurality of routing tables RT1 to RTN are employed, and the route information is saved in these routing tables RT1 to RTN, respectively.

Normally, a routing table is constructed of more than one memory. Also, these routing tables need not have the same memory sizes.

In other words, a routing table may be arranged by employing more than one main table, and more than one supporting table (for example, a supporting table capable of saving only difference information).

In response to an instruction issued from the route processor unit 1, the table switching unit 2 selects a proper routing table at this stage, and provides the selected routing table to the route processor unit 1.

This table switching unit 2 may be managed by a selector realized by a software manner, or by a logical manner.

On the other hand, the rewriting time saving unit 3 has storage regions which correspond to the above-explained routing tables in an one-to-one correspondence. The data about the time instant when the relevant routing table is updated is saved in the relevant storage region of the rewriting time saving unit 3.

The route processor unit 1 manages a plurality of routing tables based upon the data saved in this rewriting time saving unit 3.

This rewriting time saving unit 3 may be arranged by more than one memory, or more than one register.

Also, the time saving operation may be realized by a hardware-only structure without utilizing the processor unit, or by writing the time data by the processor unit.

It should be understood that the data saved in the rewriting time saving unit 3 may be defined by using a time instant as reference data. Alternatively, when such data are available from which the data rewriting time history can be recognized, the time instants are not always used as the reference data.

Operations of First Router Apparatus

Next, a description will now be made of operations of the router apparatus according to the first embodiment.

In response to an externally-supplied request, the route processor unit 1 stores the route information into the routing table RT1, RT2, - - - , RTN under normal condition.

In this first embodiment, since more than two sets of routing tables are employed, the route processor unit 1 selects one proper routing table to save the route information in this selected routing table.

In the initial stage, the route information is saved in the routing table of default.

After the routing table has been properly set, the route processor unit 1 executes the routing operation based upon the route information saved in this set routing table.

In the case that the content of the routing table is required to be updated upon receipt of a request issued from the external unit, the route processor unit 1 refers to the rewriting time saving unit 3, and selects such a routing table that the saved content thereof has been updated at the oldest update timing. Then, the route processor unit 1 stores the route information into this selected routing table.

After this rewriting operation has been accomplished, the route processor unit 1 controls the table switching unit 2 to switch the rewritten routing table to the latest routing table, and then performs the routing operation based upon this latest routing table.

Normally, it is assumed that a plurality of routing tables may be selectively used by this logic idea.

In the case that a communication failure happens to occur, when it is so predicted that this communication problem is caused by a routing table, since this routing apparatus has plural sets of new/old routing tables, RT1, RT2, - - - , RTN, the route processor unit 1 switches the current routing table to the immediately current routing table, so that the communication may be immediately recovered from this communication problem.

Also, the route processor unit 1 compares the old routing table with such a routing table where the communication failure happens to occur so as to investigate the failure reason.

As the method of using the routing table, assuming now that all of the route information obtained at this stage are stored into a single routing table, when the content of the routing table is changed, all of the changed route information are stored into the different routing tables.

This type of routing table using system is characterized in that the routing tables can be easily managed, as compared with the routing table using system in which only differences (will be discussed later) are saved. As apparent from this characteristic, this structural method can be further protected from the communication failure.

However, this routing table using method requires a large number of memory resources and also requires that a lot of writing operations are carried out. As a consequence, the overall system should become bulky. The writing time and the switching time of the routing tables are increased.

On the other hand, the method of managing only the difference information by using a plurality of routing tables may be realized by paying an attention to the following fact. That is, inmost cases that a communication failure happens to occur, only a portion of route information used while a content of a routing table is updated is changed under normal operation.

While more than one main routing table is prepared, the old route information is saved in more than one sub-table so as to manage these main routing table and sub-table.

In accordance with the latter routing table managing method, since the memory and/or the entire system can be made smaller, the switching time of these routing tables can be shortened, as compared with the former routing table managing method.

However, since the difference information is managed, the logical ideas capable of managing a plurality of routing tables become more complex.

Generally speaking, this latter routing table managing method will be deteriorated in view of the failure preventive characteristic, as compared with the managing method for managing a plurality of perfect routing tables.

Arrangement/Operation of Second Router Apparatus

Next, an arrangement of a router apparatus according to a second embodiment of the present invention will now be explained.

The arrangement of this second router apparatus is characterized in that an increase in control amounts, which is caused by employing a plurality of routing tables, is shared by a hardware manner.

Concretely speaking, since a conventional router apparatus has no such a conceptional idea that a plurality of tables are circularly used, an additional controlling program and/or algorithm should be realized by a hardware manner in order to minimize the necessary changes with respect to the program and/or algorithm applied to this conventional router apparatus.

That is to say, the router apparatus of the second embodiment is characterized by employing a Round-Robin register main body 13, and also a Round-Robin control unit 12 for controlling this Round-Robin register main body 13, which have the following major purpose. That is, an information writing sequence with respect to routing tables is maintained.

Subsequently, the operation of the router apparatus according to the second embodiment will now be explained.

In the first embodiment, the managing operation for a plurality of routing tables is also carried out by the route processor unit 1. To the contrary, this managing operation is performed by a hardware structure mainly containing the Round-Robin algorithm in the router apparatus according to the second embodiment.

While the router apparatus according to the second embodiment is operated under normal condition, since the routing tables are managed by the hardware manner, the route processor unit 11 executes the writing/reading operations with respect to such a routing table which is managed and/or controlled by the hardware manner.

As a result, the route processor unit 11 need not handle the management of the plurality of routing tables under normal condition.

When a communication failure happens to occur, the route processor unit 11 notifies the occurrence of this failure to the Round-Robin control unit 12, and then, switches this failed routing table to the condition of the routing table immediately before this failure occurs by way of the hardware manner, or an arbitrary instruction issued from a processor.

In this drawing, the routing tables and the memory are provided in an one-to-one correspondence. Alternatively, these routing tables and memory may be logically sectioned, and the sectioned portions may be managed.

While the various embodiments of the present invention have been described with reference to the drawings, the present invention is not limited thereto, but may be modified, changed, without departing from the technical scope and spirit of the invention.

In accordance with the router apparatus of the present invention, when the communication failure happens to occur, the condition of the failed routing table can be immediately returned to the original condition of the routing table just before this communication failures happen to occur without performing any complicating operation due to a large number of procedures, nor analyzing the reason for the failure, so that the communication can be recovered.

Also, since the conditions of the routing table before/after the communication failure happens to occur can be easily compared with each other, the reason why such a communication failure happens to occur can be readily investigated. As a consequence, since this investigation of the communication failure reason may improve the quality and reliability of the system, there is such an effect that the communication quality as well as the communication reliability can be improved.

What is claimed is:

1. A router apparatus comprising:

a plurality of routing tables into which new route information is stored every time route information is changed;

a rewriting time saving unit for saving rewriting time information of said plurality of routing tables;

a table switching unit for switching said plurality of routing tables; and a route processor unit for managing, for example, setting/rewriting/deleting the routing table based upon route information supplied by a network operator, or route information obtained from routing protocol, wherein when a communication failure caused by the routing table occurs, said failed routing table is switched to another routing table into which old route information has been stored so as to continue the communication, and also, a communication failure reason is investigated by comparing the route information before/after said failed routing table is switched.

2. A router apparatus as claimed in claim 1, wherein said old route information is the latest route information.

3. A router apparatus as claimed in claim 2, wherein only difference information is stored into said plurality of routing tables.

* * * * *